United States Patent Office 3,406,245
Patented Oct. 15, 1968

3,406,245
ELECTRIC CABLE INSTALLATIONS
Roland Howard Weir Watkins, Kent, England, assignor to British Insulated Callender's Cables Limited, London, England
Filed Aug. 23, 1966, Ser. No. 574,334
Claims priority, application Great Britain, Aug. 24, 1965, 36,322/65
8 Claims. (Cl. 174—15)

This invention relates to electric cable installations in which a cable is cooled by the circulation of a cooling fluid from one end of a length of the cable to the other (which length is a part only of a complete route length and may comprise one or more jointed cable lengths), through the cable or through a conduit associated therewith, through a return pipe, and through at least one heat exchanger for extracting heat from the fluid. The invention is especially but not exclusively concerned with oil-filled power cable installations in which the cooling fluid is the insulating oil with which the dielectric is impregnated and in which a duct for circulation of the oil is provided through the or each conductor of the cable.

In accordance with the present invention, in an installation of this kind, each of a number of successive cooled lengths of the cable (hereinafter referred to as "individually cooled lengths") is associated with one or more primary heat exchangers, in which heat is transferred from the (primary) circulating cooling fluid of the individually cooled length to a secondary cooling fluid, and the secondary cooling fluid passes continuously through a pipe or duct associated with and extending along at least a major part of a cable length (hereinafter called a "cooled section") constituted by a number of individually cooled lengths.

The secondary cooling fluid preferably circulates through a closed system comprising two pipes or ducts, each extending along at least a major part of the cooled section, and one or more secondary heat exchangers in which heat is extracted from the secondary cooling fluid, e.g., by transfer to a tertiary cooling fluid, usually air. Where however the secondary cooling fluid is air, instead of circulating the air in a closed circuit it will normally be passed from the atmosphere at one end of a length of the pipe or duct associated with a cooled section of the cable and vented to the atmosphere at the other end of the pipe or duct. In this case the pipe or duct through which the air passes is preferably a pipe or duct in which the cable or a number of cables are laid. The primary heat exchangers will then comprise pipes or other vessels, through which the primary circulating fluid passes so mounted in the duct that they expose an adequate heat transfer surface to the air circulating through the duct. It is stressed that the present invention relates to such a system only when the same body of air passes successively over a number of vessels, each forming part of a primary heat exchanger for a different individually cooled length. The vessels may be lengths of the same pipe sealed one from the other.

In a cable installation comprising a number of cables laid alongside each other, as an alternative to providing each individually cooled length of cable with a separate primary heat exchanger forming part of or connected in the return pipe, a single return pipe with associated heat exchanger or exchangers may serve two or more individually cooled lengths of cable lying alongside each other, the capacity of the heat exchanger or exchangers being suitably increased to absorb the heat generated in all of the parallel cable lengths connected to the single pipe. Whether the installation comprises a single cable or a number of cables laid alongside each other, each individually cooled length of cable may, if desired, be served by more than one return pipe. Where there are several return pipes, each pipe may form part of or be provided individually with its primary heat exchanger or exchangers or all of the pipes or separate groups of the pipes may be associated with the same primary heat exchanger or exchangers.

The primary cooling fluid circulated through the cable or a conduit associated therewith need not be an insulating fluid and need not be in direct contact with the cable dielectric. It may for example be circulated through a conduit helically applied around a cable or, in a three phase installation in which the cables are arranged in trefoil, it may be a conduit located in the central space between the three cables. In a pipe line cable system, the primary cooling fluid may circulate through the pipe line in which the cable or cables are located.

As already indicated, we prefer however to circulate the primary fluid through the cable conductor or conductors, since this is where most of the heat is generated, and to use a fluid that serves the dual purpose of impregnating the cable dielectric and cooling the cable.

Any form of primary heat exchanger for positively extracting heat from the primary cooling fluid can be used, provided that in each primary heat exchanger heat is transferred from the primary fluid to the secondary cooling fluid passing through at least one pipe or duct associated with and extending along at least a major part of a cooled section of the cable. For example, the primary heat exchanger may be an elongated heat exchanger extending along a major part of the individually cooled length of the cable, of the kind described in co-pending application Serial No. 487,126, now U.S. Patent 3,363,046 of John Derrick Endacott.

In accordance with normal practice, the circulating path for the primary cooling fluid may be connected to a reservoir or reservoirs and to pressure compensating means, as necessary. Where the secondary cooling fluid itself circulates in a closed system and is a liquid, similar compensating means will generally be necessary.

A number of installations in accordance with the invention will now be described by way of example with reference to the accompanying drawings, in which.

In each installation each cooled section of cable consists of a number of successive individually cooled lengths of oil filled cable, interconnected by stop joints and high pressure joints as hereinafter explained. Each individually cooled length of cable, which may be a single drum length or a number of drum lengths interconnected by straight through joints, is cooled by circulation of the insulating oil through the hollow conductor of the cable and a return pipe which incorporates a primary heat exchanger.

Referring to FIGURES 1 to 4, the first installation consists of two 400 kv. feeders each consisting of three cables, all six cables being laid in a duct of approximately 7 ft. diameter. Stop joints at intervals of about 300 yards divide the cables into individually cooled lengths and the ancilliary equipment located at the stop joint bays will be described with reference to FIGURES 2 to 4 and their overall function in the installation will be described with reference to FIGURE 1.

Figure 1:
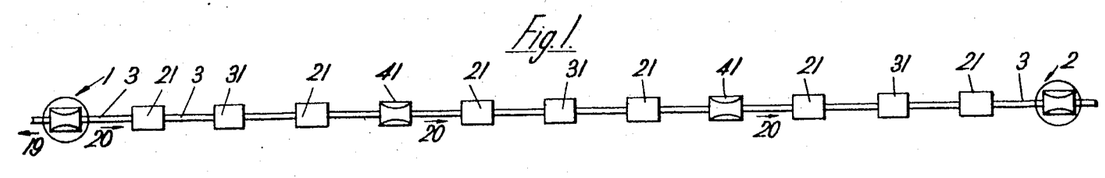
FIGURE 1 is a general layout drawing of part of the first installation to be described.

FIGURE 1 represents a cooled section of the installation extending over 3,600 yards between an "air intake" joint bay 1 and an "air exhaust" joint bay 2, the drawing showing the cable duct 3 and the various joint bays. At the air intake joint, shown in FIGURE 2, the cable duct 3 passes through a fan chamber 4 which houses two air impeller fans 5 and 6 and is itself located in a jointing chamber 7. The chamber 7 is preferably situated considerably below ground level, indicated as 8; for example the distance between ground level and the upper surface of the joint chamber 7 may be 20 yards. The fan chamber 4 is connected to the atmosphere by an air intake pipe 9.

All six stop joints 10 are located side by side at the bottom of the joint chamber 7. For convenience the cables 11 and 12 have also been shown as located at the bottom of the duct 3 but in practice the duct will be of circular cross-section and the six cables will be distributed on brackets around the lower part of the duct. Each joint 10 is provided with two oil outlet pipes 13 and 14 connected respectively to oil ducts formed by the hollow conductors of the cables 11 and 12, the joint providing an oil barrier between the two lengths of cable connected at the joint. The outlet pipes 13 for all six joints located in the joint chamber 7 are connected in parallel to a pump 15 located in the chamber 7 alongside the fan chamber 4. The pump 15 extracts oil from the cables 11 through the outlet pipes 13 and delivers it into three return pipes 16 which pass along the duct 3 to the next joint bay. Similarly another pump 17 delivers oil from the outlet pipes 14 to three return pipes 18 passing in the opposite direction along the duct 3. The fans 5 and 6 located in the fan chamber 4 drive air from the air intake pipe 9 along the duct 5 as indicated by the arrows 19 and 20 in FIGURES 1 and 2.

Figure 3:
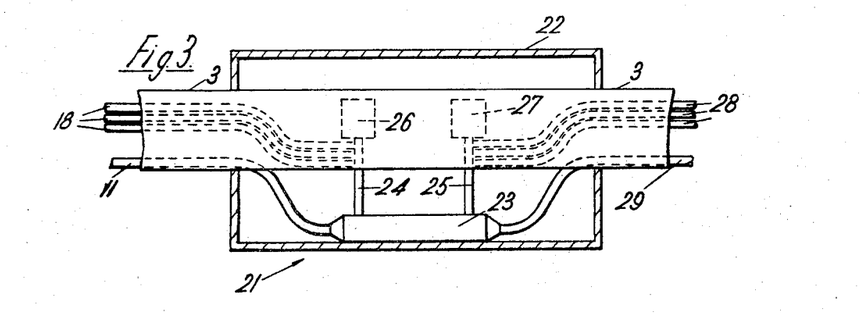

Referring to FIGURE 3, the next joint bay to the air intake joint bay 1 is an "oil expansion" joint bay 21. At this joint bay the duct 3 passes through a joint chamber 22 at the bottom of which six stop joints 23 are located. Each stop joint is provided with oil inlet pipes 24 and 25 on opposite sides of the oil barrier and the six inlet pipes 24 are connected in parallel to an oil expansion tank 26 and to the oil return pipes 18. The inlet pipes 25 are similarly connected to an expansion tank 27 and to another set of oil cooling pipes 28 which pass along part of the duct 3 in which further cable lengths 29 are located. This oil expansion joint bay 21 is located at approximately 300 yards from the air intake joint bay 1.

Figure 2:
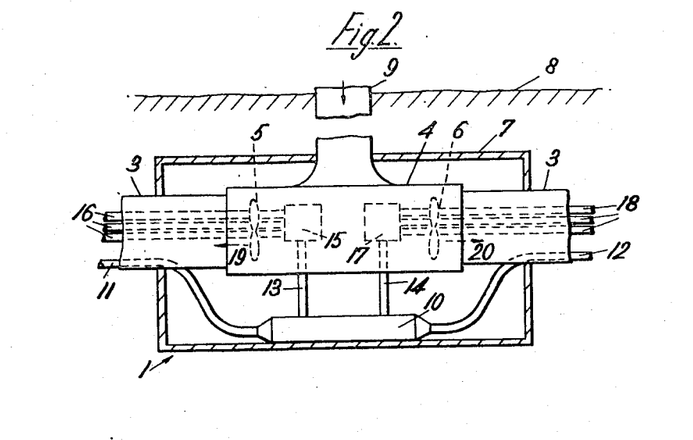
FIGURES 2, 3 and 4 are diagrammatic drawings of three types of joint bays to be used in the installation.

The next stop joint bay 31 is a "pump" joint bay. It is similar to the oil expansion joint bay shown in FIGURE 3 but each stop joint is provided with two oil outlet pipes connected to pumps, as shown in FIGURE 2, instead of to the expansion tanks 26 and 27, and each pump delivers the oil into three return pipes, equivalent to the groups 18 and 28. The pump equivalent to the pump 15 in FIGURE 2 delivers oil to the return pipe 28 of the oil expansion joint bay shown in FIGURE 3 and the pump equivalent to the pump 17 delivers oil to three return pipes passing to the next joint bay, which is an oil expansion joint bay 21 identical with that shown in FIGURE 3.

Figure 4:
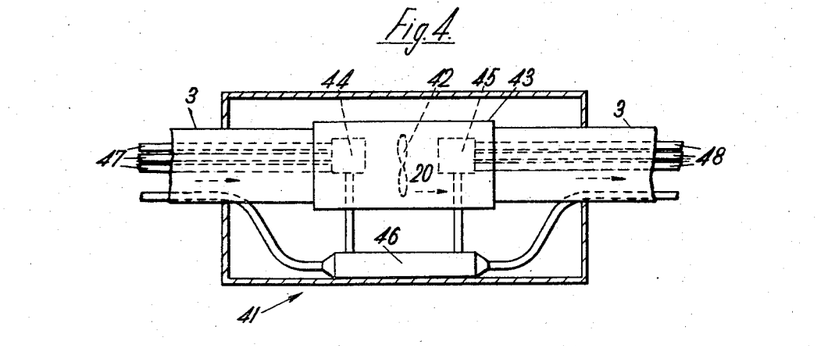

The joint bay after the last mentioned oil expansion joint bay 21 is a "fan and pump" joint bay 41 and is shown in FIGURE 4. This joint bay resembles that in FIGURE 2 except that it is provided with one fan 42 in a fan chamber 43 and this fan impels air through the duct 3 in the same direction as the fan 6, namely the direction marked with an arrow 20. Pumps 44 and 45 deliver the oil from the joints 46 to return pipes 47 and 48 respectively.

Referring to FIGURE 1, the remainder of the joint bays are of the three types already described, namely oil expansion joint bays 21, pump joint bays 31 and fan pump joint bays 41, except the last joint bay of the cooled section, which is the "air outlet" joint bay 2. It is identical with the joint bay described with reference to FIGURE 2, except that the fans 5 and 6 rotate in opposition to move the air in the opposite direction to the equivalent fans shown in FIGURE 2. Hence air is extracted from the duct 3 and ejected through a pipe equivalent to the pipe 9 functioning as an air outlet pipe.

From the above description it will be seen that air is impelled continuously through the duct 3 of the whole of the cooled section shown in FIGURE 1 by one fan 6 located in the air inlet joint bay 1 and by two fans 42 each located in one of the fan pump joint bays 41 and is extracted from the duct by one of the fans (equivalent in position but not in direction of rotation to the fan 5) located in the air exhaust joint bay 2. At the air intake and air exhaust joint bays and at the pump joint bays and fan pump joint bays, oil is extracted from the cables and is passed through return pipes to an expansion joint, where it is returned to the cables. During its passage through these return pipes the oil is cooled by the secondary cooling fluid, namely the forced draught of air extracted from the atmosphere at the joint bay 1, passed continuously through the whole length of the duct 3 of the cooled section and returned to the atmosphere at joint bay 2.

At each joint bay where the cables pass into and out of the duct, suitable sealing arragements are provided to prevent escape of air from the duct and similarly, where the oil pipes leave the duct (as in the joint bays shown in FIGURES 2 and 4) to make connection with pumps located outside the fan chambers 4 and 43 respectively, suitable glands are provided to prevent the escape of air from the duct.

The fan chambers and the joint enclosures can conveniently be of circular cross-section, for example the fan chambers may be of 12 ft. diameter and the joint enclosures of 21 ft. diameter, horizontal platforms being provided for supporting the equipment, such as oil expansion tanks, pumps, and fan chambers, above the stop joints.

A convenient method of leading the cables from the duct 3 into the joint enclosure is to interpose in the duct at the point of entry of the main duct into the enclosure a short length of tubular duct of greater diameter than the main duct and to take the cables into the joint enclosure through the lower part of the space between the main duct and this larger diameter length, which overlaps the ends of the main duct. Sealing can then easily be effected by filling the lower part of the part of larger diameter with concrete to embed the cables and extending the concrete filling to fill the annular spaces between the main duct and the larger part.

Figure 5:
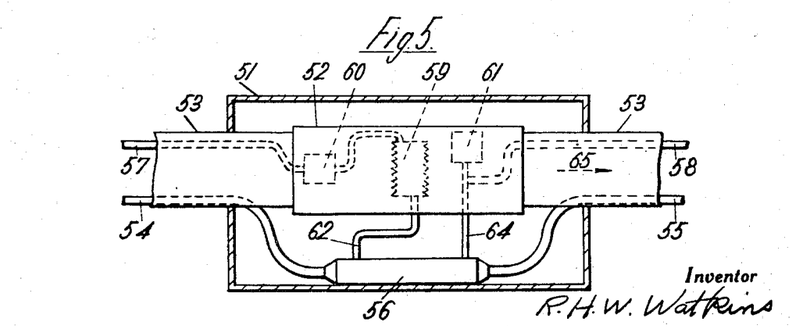
FIGURE 5 is a diagrammatic drawing of a joint bay of a second installation.

The second installation, to be described with reference to FIGURE 5, is a modification of the system described with reference to FIGURES 1 to 4. In this installation all of the joint bays, except an air intake joint bay and an air outlet joint bay situated at the ends of a cooled section, are identical and are constructed as shown in FIGURE 5. Within the joint enclosure 51 is a subsidiary chamber 52 connected to a duct 53 carrying the six cables, comprising lengths 54 connected to lengths 55 by stop joints 56, and single oil return pipes 57 and 58. Within the subsidiary chamber 52 is an oil to air heat exchanger 59. A pump 60 and an oil expansion chamber 61 are mounted alongside the chamber 52. Oil is pumped from outlet pipes 62 of the joints 56 through the heat exchanger 59 by the pump 60 and impelled along the oil return pipe 57 to the next joint bay. Similarly, oil from the next joint bay, in the opposite direction, passes along the return pipes 58 through an inlet pipe 64 into the joint 56, the inlet pipe 64 also being connected to the expansion tank 61. Air is impelled through the duct 53 and the enclosure 52 by fans located at suitable points along the cooled section, for example in joint bays similar to that shown in FIGURE 5 but provided with an air inlet or an air outlet as necessary, the direction of the air flow being indicated by the arrow 65.

Figure 6:
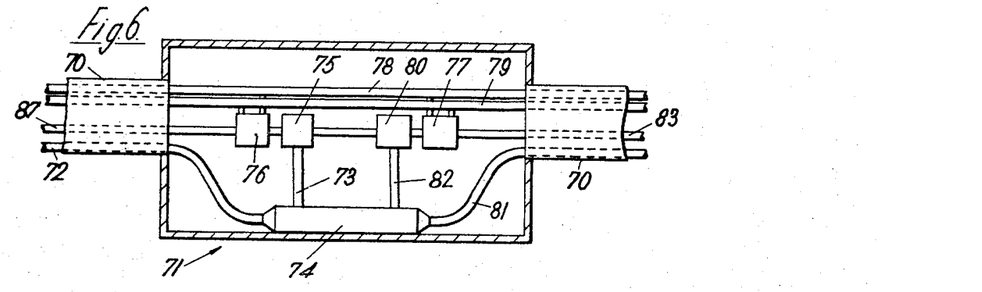
FIGURES 6 and 7 are diagrammatic drawings of joint bays of a third installation.
Figure 7:
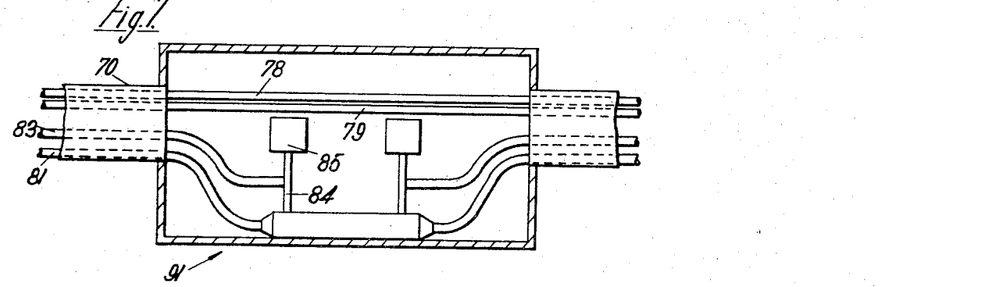
Figure 8:
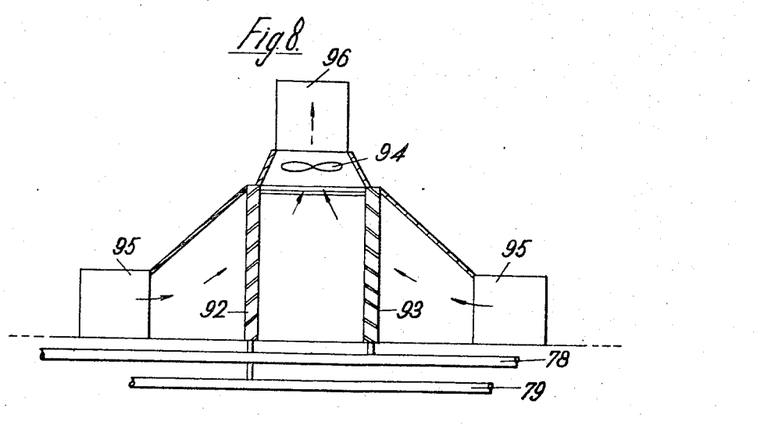
FIGURE 8 is a diagrammatic drawing of a secondary heat exchanger for use in the third installation.

The third installation, described with reference to FIGURES 6 to 8, is suitable for use either with cables laid in a duct or with cables buried in a trench. FIGURES 6 and 7 show diagrammatically the forms of joint bays used when the cables, which again may consist of two feeders each consisting of three cables, are located in a duct 70. Similar joint bays will be used when the cables are buried in a trench except that they will normally be designed to receive one feeder (of three cables) only. In this installation, only two forms of joint bay are used, "pump" joint bays and "oil expansion" joint bays. In the pump joint bay 71 shown in FIGURE 6, oil is extracted from the cables 72 through outlet pipes 73 of the joints 74 by a pump 75 and pumped through an oil-water heat exchanger 76 into a return pipe 87. Water, which forms the secondary cooling fluid in the heat exchanger 76 and in a similar heat exchanger 77, is supplied from a water main ("go pipe") 78 and a water return pipe 79. Oil circulated through the heat exchanger 77 by a pump 80, that is oil extracted from the cables 81, passes along a return pipe 83 to the oil expansion joint bay 91 shown in FIGURE 7. Here the oil re-enters the cable 81 through the inlet pipe 84, which is also connected to an expansion tank 85. No connections are made to the water go and return pipes 78 and 79 in the oil expansion joint.

It will be seen that in both forms of joint bay the duct 70 does not extend through the joint enclosures, since forced air circulation is not relied on for cooling purposes. As in the installations previously described the joint bays may be located at intervals of 300 yards.

At suitable intervals along the cable installation, for example at intervals of 3,600 yards, heat exchangers for cooling the water may be provided. A suitable heat exchanger of the air blast type is shown diagrammatically in FIGURE 8. Water from the return pipe 79 is pumped through heat exchanger elements 92 and 93 through which a forced draught of air is impelled by a fan 94, the air inlets being provided with attenuators 95 and the air outlet being provided with an attenuator 96 to reduce fan noise emitted from the heat exchanger. From the heat exchanger elements 92 and 93 the cooled water is delivered by further pumps (not shown) into the water go pipe 78. If necessary heat exchangers such as that shown in FIGURE 8 may be provided at both ends of each cooled section of cable consisting of twelve individually cooled cable lengths but alternatively it may only be necessary to provide a heat exchanger at one end of the cooled section and at the other end to connect the water go pipe to the water return pipe directly or through a pump.

Figure 9:
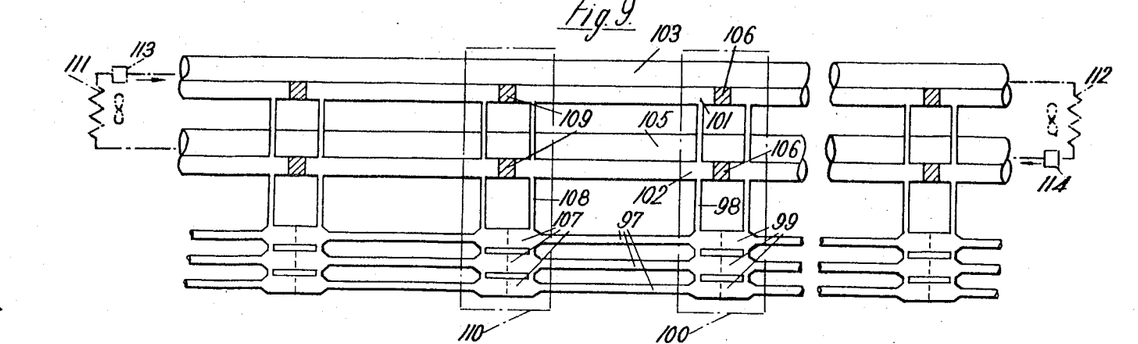
FIGURE 9 is a diagrammatic drawing of part of a fourth installation.

FIGURE 9 shows in diagrammatic form an installation which is a modification of that described with reference to FIGURES 6 to 8. It is applied to a single feeder consisting of three cables 97. At a typical joint bay, indicated by the chain dotted line 100, the inlet pipes 98 of the three joints 99 are connected to two oil return pipes 101 and 102 which function in parallel. The return pipe 101 is immersed in or forms part of a water main 103 as shown in cross-section in FIGURES 10, 11 or 12.

Figure 10:
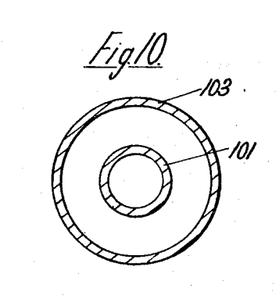
FIGURES 10, 11 and 12 are cross-sections of combined oil water pipes for use in the fourth installation.
Figure 11:
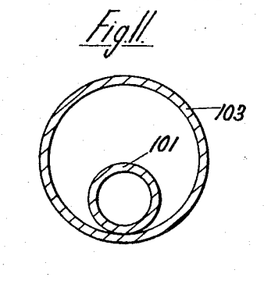
Figure 12:
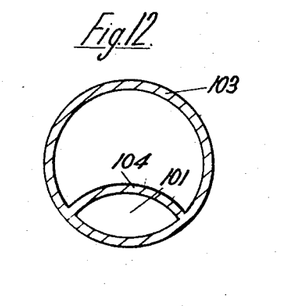

In FIGURE 10 the oil pipe 101 is concentrically arranged within the water pipe 103, in FIGURE 11 the oil pipe 101 rests at the bottom of the water pipe 103 and in FIGURE 12 the oil pipe 101 is a part of the water pipe 103, the oil being separated from the water by a longitudinal barrier 104. The composite pipes are preferably flexible so that they can readily be laid with the cable in a duct or trench. Circumferentially corrugated pipes, e.g. of aluminium, may be used.

In a similar way the other return pipe 102 forms part of a water return pipe 105. The oil pipe is separated into lengths between stop joints by barriers 106 and it will be seen that the oil leaving the joints 99 by the outlet pipes 98 after passing through the return pipes 101 and 102 is caused to reenter the cables 97 at joints 107, through inlet pipes 108, by barriers 109. The joints 107 are at a joint bay, indicated by the chain dotted line 110, about 300 yards from the bay 100.

At suitable longer intervals, which in this case may be greater in length than the aggregate length of twelve individually cooled lengths air-to-water heat exchangers for cooling the water passing through water pipes 103 and 105 are provided. These heat exhcangers, indicated at 111 and 112 may be similar to that described with reference to FIGURE 8, pumps 113 and 114 being provided for impelling water through the heat exchangers. It will be appreciated that the water pipes do not function as go and return pipes; they have equivalent functions.

At any joint bay in a cooled section, except the middle joint bay of the section, water in one of the water pipes will be hotter than in the other; for example at the joint nearest the heat exchanger 111 cold water will be supplied to the pipe 103 through the pump 113 whereas hot water will pass from the pipe 105 into the heat exchanger 111. Adjacent the heat exchanger 112 the opposite situation will prevail. Hot water will enter the heat exchanger 112 from the water pipe 103 whereas cold water will enter the pipe 105 from the pump 114. This gives the installation the advantage over that described with reference to FIGURES 6 to 8 that a substantially equal amount of heat can be extracted from the group of joints situated at each joint bay without its being necessary to vary the rate of flow of oil into and out of the joints from bay to bay. In the arrangement diagrammatically shown in FIGURE 9 the oil circulates by convection but as in the previously described installation pumps may be provided for oil circulation if desired.

Figure 13:
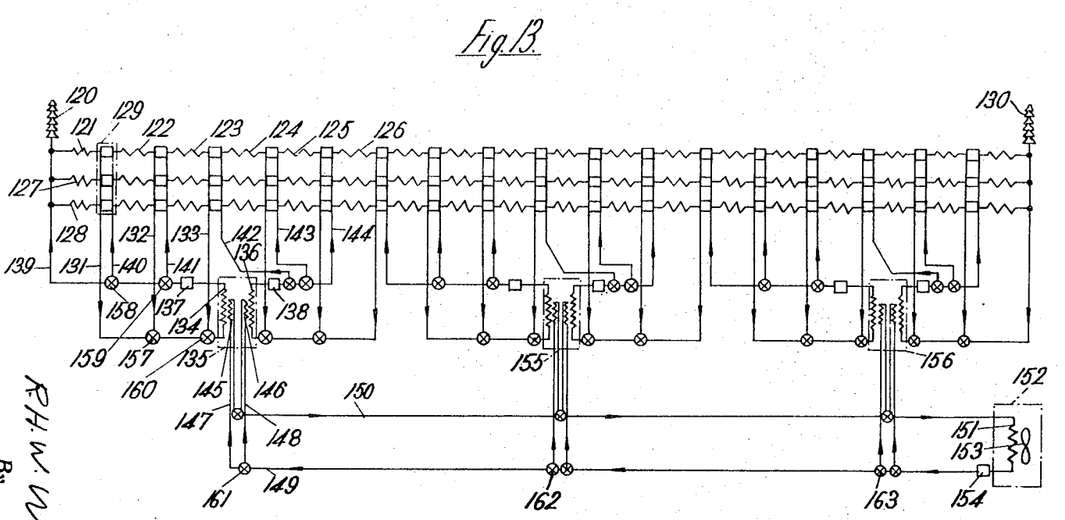
FIGURE 13 is a diagrammatic drawing of a fifth installation.

The fifth installation to be described by way of example, which is shown diagrammatically in FIGURE 13, is a 400 kv. three-phase link between sealing ends. It differs from the installations described in the previous examples in that the primary fluid from each three successive individually cooled lengths circulates through the same secondary heat exchanger. One of the sealing ends 120 is shown connected to the first individually cooled length 121 of one of the cables, the next five successive individually cooled lengths of the same cable being indicated by 122 to 126. The first individually cooled lengths of the other two cables are marked 127 and 128 respectively but their sealing ends are omitted. The first joint bay situated at the end of the first individually cooled lengths 121, 127 and 128 is indicated by the chain dotted line 129.

In the bay 129 oil is extracted from the first individually cooled lengths of the three cables through an outlet pipe 131. Similar outlet pipes 132 and 133 from the next two joint bays are connected in parallel with the pipe 131 to one primary coil 134 of a double heat exchanger indicated by the chain dotted line 135. In the double heat exchanger 135 a further primary coil 136 receives oil from the next three sets of individually cooled lengths represented by the lengths 124, 125 and 126 of the first cable.

From the two primary coils 134 and 136 the oil is returned to the same cable lengths by pumps 137 and 138 through return pipes 139–141 and 142–144 respectively. The pipe 139 is connected to the three sealing ends (12) and the pipes 140–144 are connected to stop joints.

The secondary coils 145 and 146 of the heat exchanger 135 are fed with water through pipes 147 and 148 respectively which are connected in parallel to a go pipe 149. They discharge into a common return pipe 150 and the water in the return pipe 150 passes through the primary coil of a heat exchanger indicated by the chain dotted line 152, the coil being cooled by a forced draught of air generated by a fan 153. From the primary coil 151 the water is delivered along the go pipe 149 by a pump 154.

Along the cooled section of cable forming the link between the sealing ends represented by 120 and three further sealing ends represented by 130, there are two further double primary heat exchangers 155 and 156 each serving six successive individually cooled lengths of each cable of the link, in a similar manner to the heat exchanger 135, the secondary coils of the heat exchangers 155 and 156 being similarly connected to the go and return water pipes 149 and 150. The total length of the link is 16,200 yards, the distance between the stop joints of individually cooled lengths is 300 yards and the distance between the primary heat exchangers is 1,800 yards.

In the oil circulating and water circulating systems, hydraulic valves are provided as necessary to enable the flow of fluid along the various branches of the two systems to be suitably controlled by pre-setting the valves, typical hydraulic valves in the oil system being indicated by 157 to 161 and typical hydraulic valves in the water system being indicated by 161 to 163.

In this installation, which is designed for a current carrying capacity of 3,200 amps, the conductor ducts in each cable have a diameter of 2″ and the rate of flow of oil through each duct is 20 gallons a minute. The hollow conductors of the cables are built up on supporting spirals of steel tape and the diameter referred to is the internal diameter of the spiral.

Assuming that the installation is in substantially level ground, the oil pressure drop in each individually cooled length of cable is approximately 40 lbs. To restrict the pressure drop to approximately 10 lbs. in each of the three lengths of return pipe between the valve 158 and the sealing ends, between the valves 158 and 159, and between the pump 137 (which is located adjacent to the heat exchanger) and the valve 159, the diameters of these three parts of the return pipe are respectively 2¾″, 3½″ and 4″. The three parts of the feed pipe to the heat exchanger, i.e. from the stop joint 129 to the valve 157, from the valve 157 to the valve 160, and from the valve 160 to the heat exchanger are similarly of the same three different diameters respectively.

The pressure drop through the heat exchanger primary coil is approximately 5 lbs. and hence the pump is designed to deliver oil at 180 gallons per minute against a head of at least 175 lbs. Reserve pumps are preferably connected in parallel with each of the pumps 141 and with the pump 154, with automatic means for bringing the reserve pump into circuit to by-pass the main pump if the main pump fails.

To extract sufficient heat from the oil, water is circulated through each secondary coil (145, 146) of each of the heat exchangers 135, 155 and 156 at a rate of 75 gallons per minute. The internal diameters of the lengths of the water go pipes 149, extending between the valves 161 and 162, the valves 162 and 163, and the valve 163 and the pump 154, are respectively 4¾″, 6¼″ and 6¼″, to give pressure drops of 50 lbs. in each length. The equivalent lengths of the water return pipe are of the same diameters.

The pressure drop in the water circuit of each of the heat exchangers 135, 155 and 156 is 15 lbs. and that in the heat exchanger 152 is 20 lbs. thus the pump 154 is required to deliver 450 gallons per minute at a pressure of 365 lbs.

When such an installation is made in a hilly district, it may be necessary to provide additional oil and water pumps and/or additional hydraulic control valves in order to ensure that a substantially equal quantity of heat is extracted from each individually cooled length of cable. In some circumstances it may additionally be necessary so to control the flow of the cooling fluids that different quantities of heat are extracted from separate individually cooled lengths which have different natural cooling rates owing to differences in the surroundings, such as soil condition and depth of installation.

It will be appreciated that similar considerations apply to the first four installations described with respect to and shown in FIGURES 1 to 12, in the simplified drawings such additional pumps and hydraulic control valves have not been shown.

Figure 14:
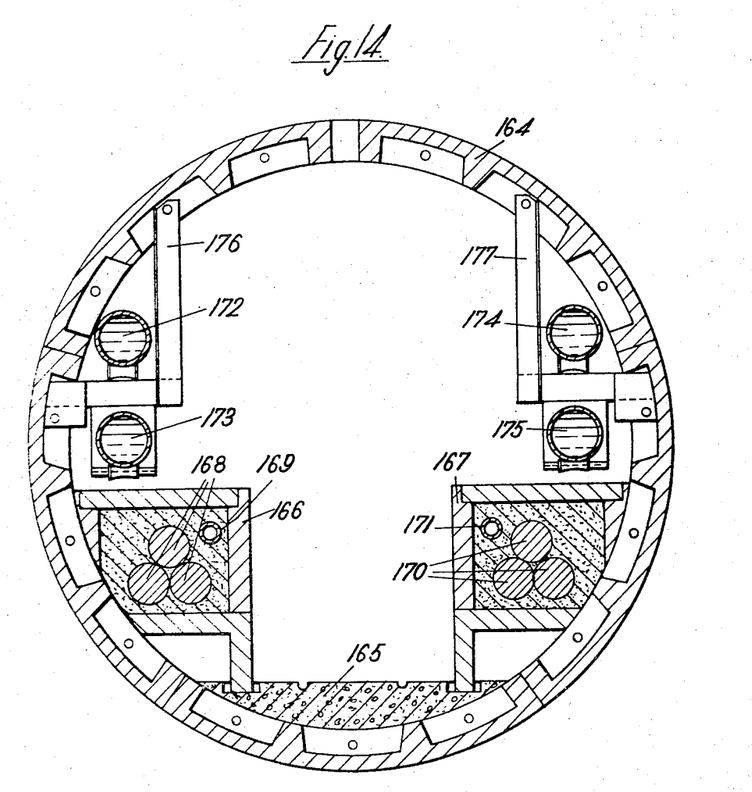
FIGURE 14 is a cross-section of a cable duct.

We prefer to install the cables, the return pipes and the water pipes (where used) of the various systems in accordance with the invention within a single duct extending along the cable route and FIGURE 14 shows a typical duct suitable for use in the system described with reference to FIGURES 6 and 7. In this drawing the duct 164 is built up from metal sections and has an internal diameter of 7 ft. The lower part of the duct is filled with concrete 165 to provide a level floor. On each side of a central passage sand filled boxes 166 and 167 are provided, the three cables 168 and the oil return pipe 169 of one feeder being embedded in the sand filling the box 166 and the three cables 170 and the oil return pipe 171 of the other feeder being embedded in the sand contained in the box 167. Separate 8″ diameter go and return water pipes 172–175 for each feeder are carried on rollers supported by brackets 176 and 177 above the cable boxes.

In the installations described by way of example, the individually cooled lengths of cable are all interconnected by stop joints. When, however, as in most of the examples the primary cooling fluid enters adjacent successive cooled lengths at the same joint, this joint can be a high pressure joint instead of a stop joint, that is a joint in which there is no absolute barrier to oil flow from one cable length to the next but sufficient resistance to oil flow from one length to the other to ensure that oil flows in substantially equal quantities from the joint in opposite directions along the conductor ducts of the two individually cooled cable lengths connected by the joint. It will be appreciated that it will be necessary to use a stop joint at the point where the oil leaves two adjacent successive cooled lengths of the cable and passes through pumps along the return pipe.

Cable installations in accordance with the invention have the advantage that the most bulky parts of the cooling system can be distributed along the cable route or in the case of secondary heat exchangers can be concentrated at widely spaced intervals along the cable route, in which case they can, if necessary, be located wholly above ground.

What I claim as my invention is:

1. An electric cable installations in which a cooled section of cable, consisting of a plurality of successive individually cooled lengths of cable, is provided with cooling means comprising:
    (a) at least one primary cooling fluid duct associated with and passing along each individually cooled length of cable to extract heat therefrom,
    (b) means for circulating cooling fluid through said ducts comprising at least one return pipe interconnecting the ends of each of the primary cooling fluid ducts,
    (c) a secondary cooling fluid duct extending along at least a major part of the cooled section of cable,
    (d) a plurality of heat exchangers arranged to transfer heat from the primary cooling fluid in the return pipes to the secondary cooling fluid in the secondary fluid duct,
    (e) means for circulating the secondary fluid comprising a secondary cooling fluid return pipe interconnecting the ends of the secondary cooling fluid duct, and
    (f) at least one secondary heat exchanger connected in the secondary fluid circuit to extract heat from the secondary cooling fluid.

2. An installation as claimed in claim 1 in which:
(a) each duct for the primary cooling fluid passes through a conductor of the cable,
(b) each duct for the primary cooling fluid and the conductor through which it passes are permeable to the cooling fluid, and
(c) the cooling fluid is an insulating fluid that permeates the dielectric of the cable.

3. An installation as claimed in claim 1 in which:
(a) the cable is an oil-filled cable and
(b) the oil acts both as an impregnant of the cable dielectric and as the cooling fluid.

4. An installation as claimed in claim 1 in which each of the primary cooling fluid return pipes passes through the secondary cooling fluid ducts to form the heat exchangers.

5. An installation as claimed in claim 1 in which the secondary fluid duct is one part of a flexible pipe divided into two co-extensive parts by a longitudinal barrier the other part of the pipe being divided into lengths by transverse barriers, which lengths form the return pipes for the primary cooling fluid and with the first mentioned part of the pipe form the heat exchangers.

6. An installation as claimed in claim 1 in which the individually cooled lengths are divided into a plurality of groups of successive lengths, connected in parallel to the primary duct of a heat exchanger serving that group.

7. An electric cable installation in which a cooled section of cable, consisting of a plurality of successive individually cooled lengths of cable, is provided with cooling means comprising:
(a) at least one primary cooling fluid duct associated with and passing along each individually cooled length of cable to extract heat therefrom,
(b) means for circulating cooling fluid through said ducts comprising at least one return pipe interconnecting the ends of each of the primary cooling fluid ducts,
(c) two secondary fluid ducts each extending along at least a major part of the cooled section of the cable,
(d) a pair of heat exchangers connected in parallel to each of the return pipes and one arranged to transfer heat from the primary fluid to the secondary fluid in one of the secondary fluid ducts and the other arranged to transfer heat from the primary fluid to the secondary fluid in the other of the secondary fluid ducts,
(e) means interconnecting the two secondary fluid ducts at each end thereof, and
(f) secondary heat exchangers in the interconnecting means.

8. An installation as claimed in claim 7 in which the secondary heat exchangers are of the air blast type.

References Cited

UNITED STATES PATENTS

| | | | |
|---|---|---|---|
| 281,220 | 7/1883 | Hendley. | |
| 2,066,321 | 1/1937 | Bennett | 174—15 |
| 2,066,322 | 1/1937 | Bennett | 174—15 |
| 2,233,765 | 3/1941 | Bennett | 174—15 |
| 2,306,850 | 12/1942 | Usselman | 174—16 |

LEWIS H. MYERS, *Primary Examiner.*

A. T. GRIMLEY, *Assistant Examiner.*